United States Patent
Tanida et al.

(10) Patent No.: US 7,657,122 B2
(45) Date of Patent: Feb. 2, 2010

(54) APPARATUS AND METHOD FOR IMAGE CONFIGURING

(75) Inventors: Jun Tanida, Kobe (JP); Kouichi Nitta, Kobe (JP)

(73) Assignee: Japan Science and Technology Agency, Kawaguchi, Saitama (JP)

( * ) Notice: Subject to any disclaimer, the term of this patent is extended or adjusted under 35 U.S.C. 154(b) by 384 days.

(21) Appl. No.: 10/596,137

(22) PCT Filed: Dec. 1, 2004

(86) PCT No.: PCT/JP2004/017881

§ 371 (c)(1),
(2), (4) Date: Sep. 19, 2006

(87) PCT Pub. No.: WO2005/055592

PCT Pub. Date: Jun. 16, 2005

(65) Prior Publication Data

US 2007/0160310 A1     Jul. 12, 2007

(30) Foreign Application Priority Data

Dec. 1, 2003    (JP)  ................ 2003-401726

(51) Int. Cl.
*G06K 9/32*     (2006.01)
*G06K 9/36*     (2006.01)

(52) U.S. Cl. .......................... 382/299; 382/276
(58) Field of Classification Search .............. 359/362; 382/298, 299
See application file for complete search history.

(56) References Cited

FOREIGN PATENT DOCUMENTS

| JP | 2003-141529 A | 5/2003 |
|---|---|---|
| JP | 2003-283907 A | 10/2003 |

OTHER PUBLICATIONS

Jun Tanida, Yoshifumi Kitamura, Kenji Yamada, Shigehiro Miyatake, Masaru Miyamoto, Takashi Morimoto, Yasuo Masaki, Noriyuki Kondou, Daisuke Miyazaki, and Yoshiki Ichioka, "Compact image capturing system based on compound imaging and digital reconstruction," Proc. SPIE 4455, 34 (2001).*

(Continued)

*Primary Examiner*—Bhavesh M Mehta
*Assistant Examiner*—Nirav G Patel
(74) *Attorney, Agent, or Firm*—Darby & Darby P.C.

(57) ABSTRACT

Using image data on a plurality of reduced object images to calculate a shift amount in regard to the gap of relative positions between the reduced object images by a correlation calculation between the reduced object images. A conversion equation is obtained from the shift amount for geometric projection process from the object image to each of the reduced object images. Initial image data on a single object image is generated using image data on the plurality of reduced object images. The above are used to estimate images of each of the reduced object images. A difference between the estimated image of the reduced object images and the reduced object images is projected in the reverse process of the geometric projection process, updating the image data on the single object image. The processes are repeated until the difference satisfies a predetermined condition and a high resolution object image is outputted.

5 Claims, 7 Drawing Sheets

OTHER PUBLICATIONS

Compact image capturing system based on compound imaging and digital reconstruction Jun Tanida, Yoshifumi Kitamura, Kenji Yamada, Shigehiro Miyatake, Masaru Miyamoto, Takashi Morimoto, Yasuo Masaki, Noriyuki Kondou, Daisuke Miyazaki, and Yoshiki Ichioka, Proc. SPIE 4455, 34 (2001), DOI:10.1117/12.450454.*

Thin observation module by bound optics (TOMBO): an optoelectronic image capturing system Jun Tanida, Tomoya Kumagai, Kenji Yamada, Shigehiro Miyatake, Kouichi Ishida, Takashi Morimoto, Noriyuki Kondou, Daisuke Miyazaki, and Yoshiki Ichioka, Proc. SPIE 4089, 1030 (2000), DOI:10.1117/12.386797.*

International Search Report for PCT/JP2004/017881 mailed Apr. 5, 2005.

Patent Abstracts of Japan for JP2003-283907 published Oct. 3, 2003.

Patent Abstracts of Japan for JP2003-141529 published May 16, 2003.

"Improving Resolution by Image Registration" by Irani et al., CVGIP: Graphical Models and Image Processing, vol. 53, No. 3, May, pp. 231-239, 1991.

"Thin observation module by bound optics (TOMBO): concept and experimental verification" by Tanida et al., *Applied Optics*, Vo. 40, No. 11, Apr. 10, 2001, pp. 1806-1813.

* cited by examiner (a)          (b)          (c)

(a)          (b)

(a)

(b)

APPARATUS AND METHOD FOR IMAGE CONFIGURING

CROSS-REFERENCE TO PRIOR APPLICATION

This is a U.S. National Phase Application under 35 U.S.C. 371 of International Patent Application No. PCT/JP2004/017881 filed Dec. 1, 2004, and claims the benefit of Japanese Patent Application No. 2003-401726 filed Dec. 1, 2003, both of which are incorporated by reference herein. The International Application was published in Japanese on Jun. 16, 2005 as WO 2005/055592 A1 under PCT Article 21(2).

BACKGROUND OF THE INVENTION

1. Field of the Invention

The present invention relates to the apparatus and method for image configuring capable of configuring a single object image of high resolution from a plurality of reduced object images of low resolution obtained by a compound-eye camera using a plurality of micro lenses.

2. Description of the Related Art

As an image input apparatus that effectively obtains various image information of high quality, image input apparatuses having structure of obtaining an object image by single optical system that is opposing to the object as a photogenic subject, such as digital cameras and video cameras, have been widely used. However, in these days, for the purpose of downsizing and tinning the image input apparatus, compound-eye cameras mimicking the compound-eye structure of such as insects have been developed.

A compound-eye camera includes a micro-lens array in which a plurality of micro lenses are arranged, as well as a photo detector formed in a planar condition, and obtains a plurality of reduced object images of low resolution focused on the photo detector by using the micro lens array. Here, when the number arrays of one-dimensional direction (one column) of the micro lens array is assumed as N, compound-eye camera can observe an observation area nearly same as the one for single-eye camera at 1/N times of the focal length (1/N thickness) of single-eye camera by using the photo detector of the same level. This significantly realizes the thinning and downsizing of the compound-eye camera compared to the single-eye camera capable of observing the same observation area, and allows a compound-eye camera to obtain a bright image of the same level as the one obtained by a single-eye camera.

FIG. 8 shows an optical system of a single-eye camera ((a) single-eye optical system) and an optical system of a compound-eye camera ((b) compound-eye optical system) in a general manner.

As can be understood by comparing FIGS. 8(a) and (b), since each of the focal lengths (in FIG. 8, indicated at f/N) of the micro lenses 80 are minimal, a compound-eye camera can be structured as a significantly downsized and thin apparatus, compared to a single-eye camera capable of obtaining an image of the same-level in brightness.

However, while the compound-eye camera can be thin, small and capable of obtaining a bright image, it has a defect that each of the reduced object images is of low resolution. Therefore, it is required to configure a single object image of high resolution by conducting image processing to these plurality of reduced object images.

As a method for obtaining a single high-resolution image from a plurality of reduced object images, for example, a method for image reconfiguring by means of such as sampling method and pseudo inverse method has been disclosed in J. Tanida, T. Kumagai, K. Yamada, S. Miyatake, K. Ishida, T. Morimoto, N. Kondo, D. Miyazaki, and Y. Ichioka, "Thin Observation module by bound optics (TOMBO): concept and experimental verification," Appl. Opt. 40, 1806-1813 (2001) (hereinafter referred to as "non-patent literature 1"). The sampling method is for reconfiguring a single object image by superposing reduced object images basing their centroid positions. The pseudo inverse method is firstly for indicating the object as a photogenic subject and the reduced object images by vectors, and describing a point spread function of optical system by matrix. It then for reconfiguring a single object image by calculating the inverse matrix of the point spread function mathematically.

Additionally, in Japanese Patent Publication No. 2003-141529 (hereinafter referred to as "patent literature 1"), a method for image reconfiguring that firstly calculates a shift amount of a plurality of reduced object images through correlation calculation between these reduced object images, and consequently obtains a high-resolution image by rearranging each pixel of a plurality of reduced images on a same area based on the above shift amount has been disclosed.

On the other hand, as a digital super-resolution technology based on an image obtained by a single-eye camera, an iterative back projection method as an iterative algorithm that generates a single high-resolution image from a plurality of low-resolution images having overlaps though having different observation positions has been disclosed in M. Irani and S. Peleg, "Improving resolution by image registration, CVGIP: Graphical Models and Image Processing", 53, pp. 231-239 (1991) (hereinafter referred to as "non-patent literature 2").

SUMMARY OF THE INVENTION

However, a compound-eye camera is for imaging a same object from a different point of view by a plurality of minute optical systems, and therefore, a plurality of reduced object images include disparities.

Therefore, since the above mentioned sampling method is a method for merely superposing a plurality of reduced object images of low-resolution formed on a photo detector, the disparities between reduced object images become the position fluctuation of the object information, and there remains a problem of failing to achieve high-resolution without improvement of the resolution of the reconstructed object image.

Additionally, in the above mentioned pseudo inverse method, it is theoretically possible to increase the resolution of reconstructed object image by describing the point spread function accurately. However, it is practically difficult to obtain an accurate distance between the object and the micro lens array or between the micro lens array and the photo detector, as well as to accurately obtain the influence from the misalignment of the micro lens array and the photo detector. Therefore, it is impossible to accurately describe the above mentioned point spread function. Furthermore, in the calculation for inverse matrix, since it is impossible to obtain an accurate inverse matrix of the point spread function, there is no other than a pseudo inverse as an approximate inverse matrix to be utilized. Consequently, there remains a problem that it is impossible to avoid lowering of the resolution of the object image obtained by reconfiguration using pseudo inverse method.

Also, according to the pixel rearranging method disclosed in the patent literature 1, there remains a problem that, even though it can obtain an image of higher resolution compared with the sampling method and the pseudo inverse method, it cannot avoid deterioration of image quality caused by the limitation of spatial resolution of a compound-eye camera itself compared to the image imaged by a single-eye camera.

In a compound-eye camera, due to the relation of magnification ratio of optical system, the observation area per pixel in each reduced object image spreads N times (N: number of arrays in one column of the micro lens array) of the observation area per pixel in a single-eye camera that observes the same observation area, and this indicates the spatial resolution per pixel being low (rough). Furthermore, the above mentioned pixel rearranging method is basically for back-projecting the pixel information on a plurality of reduced object images onto a reconfiguring surface (the same area) in one for one correspondence. This equals to approximately ignoring the opening spread of the photo detector, and therefore, deterioration can be seen in the image quality of the single image (reconstructed image) obtained by the pixel rearranging method, compared with the image imaged by single eye image input apparatus. For example, when analyzing the reconstructed image produced by the pixel rearranging method on frequency surface, the result is severely impaired in information of high-frequency content.

Consequently, this invention has been invented considering the foregoing conditions, and the purpose of this invention is to provide the method and apparatus for image configuring capable of configuring a single object image of high resolution from a plurality of reduced object images of low resolution focused on a photo detector by a micro lens array, and further, capable of configuring a single object image of high resolution even when a distance between an object and a micro lens array is inconstant, and when there is a misalignment of a micro lens array and a photo detector.

In order to achieve the above-mentioned purpose, the present invention relates to an image configuring apparatus constituted as comprising an object image configuring means, which reads image data of a plurality of reduced object images from a reduced image recording means for recording image data of a plurality of reduced object images obtained by imaging an object using a compound-eye camera that focuses a plurality of reduced object images on a photo detector through micro lens array having a plurality of micro lenses arrayed therein, and configures a single object image based on said image data and then outputs its image data, wherein the object image configuring means is characterized by conducting: a generating means of initial object image for generating an initial image data of a single object image based on the image data of a plurality of reduced object images; a reduced image estimating means for estimating an estimated image of each of the reduced object images from a image data of a provided single object image based on a geometric projection means; an object image updating means for updating an image data of the single object image provided in the reduced image estimating means by projecting a difference between the estimated image of each reduced object images and each of the reduced object images in an inverse process of the geometric projection process; and an iterative control means for firstly giving the initial image data to the reduced image estimating means as an initial value of the image data of the single object image, and then repetitively conducting the reduced image estimating means as well as the object image updating means until the difference satisfying the predetermined condition, then outputting the image data of the single object image at the time of the difference satisfying the predetermined condition as a final image data of the object image.

This is when the iterative back projection method is applied for the processing of configuring a single object image by using a plurality of reduced object images obtained by photographing of a compound-eye camera (a compound-eye image input apparatus).

Consequently, as described later, it is verified that the present invention can obtain an object image of the resolution higher than the one of high-resolution image obtained by the pixel rearranging method.

Here, when the above-mentioned object image configuring means conducts a shift amount calculating process for calculating a shift amount in regard to a gap of relative positions between the reduced object images through correlation calculation between the reduced object images by using the image data of a plurality of the reduced object images, the following two applications will be possible by using such shift amount.

The first one is to obtain a conversion equation indicating the geometric projection process employed in the reduced image estimating process.

The conversion equation indicating the geometric projection process can be set based on such as property of the compound-eye camera and a distance between an object and the compound-eye camera. However, since the distance between an object and the compound-eye camera can change according to the situation, it is not practical to set an accurate distance in each case. Also, as to the property of the camera, it may include a misalignment (the gap of position relationship between a micro lens array and a photo detector) between a micro lens array and a photo detector.

When the object image configuring means conducts the shift amount calculating process, it may further conduct a projection process deriving process for obtaining a conversion equation indicating the geometric projection process employed in the reduced image estimating process based on the shift amount obtained in the shift amount calculating process.

Since such as the relative position and the focal length between micro lenses imaging each of the reduced object images are already known, when the shift amount indicating the gap of relative positions between the reduced object images is calculated, the distance between an object as a photographic subject and the micro lenses can be calculated. Therefore, based on such distance calculated as above and the known property of the camera, the conversion equation indicating the geometric projection process can be calculated.

Moreover, when there is a misalignment between the micro lens array and the photo detector, and if the distance between the object and the micro lens array is calculated based on the shift amount calculated through correlation calculation of the reduced object images (in other words, to calculate the distance to the object based on the actual image photographed by a compound-eye camera), such distance may be considered the misalignment through the process such as averaging the distances to the object calculated for each of the reduced object images, and therefore, the conversion equation indicating the geometric projection process calculated in accordance with such distance (a distance calculated based on a shift amount) becomes as having the misalignment compensated.

Thus, it is unnecessary to set the distance between the camera (micro lens array) and the object in each case, and even if such distance is unknown (inconstant), or, even if there is a misalignment between the micro lens array and the photo detector, an object image of high-resolution can be obtained.

And in a similar way, when the object image configuring means conducts the shift amount calculating process, the generating process of initial object image conducted by the object image configuring means may generate an image data of a single object image by arranging a plurality of the reduced object images onto a same area based on the shift amount obtained in the shift amount calculating process, then may generate an initial image data of the single object image by interpolating blank pixels relative to the image data.

Thus, relative to the initial image data, the misalignment in hardware is compensated, and the object image configuring that fuses together the compensation of the misalignment and the digital super-resolution processing (processing of the iterative back projection method) can be executed smoothly.

In addition, the present invention can be regarded as an image configuring method equivalent to the processing executed by the image configuring apparatus.

In other words, the above-mentioned image configuring method configures a single object image based on a image data of a plurality of reduced object images obtained by photographing an object using a compound-eye camera that focuses a plurality of reduced object images on a photo detector through micro lens array having a plurality of micro lenses arrayed therein, and is characterized by conducting: a generating process of initial object image for generating an initial image data of a single object image based on the image data of a plurality of reduced object images; a reduced image estimating process for estimating an estimated image of each of the reduced object images from a image data of a provided single object image based on a geometric projection process; and an object image updating process for updating an image data of the single object image provided in the reduced image estimating process by projecting a difference between the estimated image of each reduced object images and each of the reduced object images in an inverse process of the geometric projection process; and an iterative control process for firstly giving the initial image data to the reduced image estimating process as an initial value of the image data of the single object image, and then repetitively conducting the reduced image estimating process as well as the object image updating process until the difference satisfying the predetermined condition, then outputting the image data of the single object image at the time of the difference satisfying the predetermined condition as a final image data of the object image.

DETAILED DESCRIPTION OF THE PREFERRED EMBODIMENTS

According to the present Invention, an object image of higher-resolution than the one of a high-resolution image obtained by the pixel rearranging method can be obtained, by generating an initial image data of a single object image based on a image data of a plurality of reduced object images obtained by a compound-eye camera, and then, as setting said initial image data as an initial value, repeatedly conducting the estimating processing of an estimated image of each of the reduced object images from an image data of a single object based on a geometric projection process, as well as the updating processing of the image data of the single object image by projecting the difference between the estimated image of each of the reduced object images and each of the reduced object images in an inverse process of the geometric projection process, until the difference satisfying with the predetermined condition.

Additionally, this invention achieves to obtain an object image of high-resolution even when a distance between a camera (micro lens array) and an object is unknown (inconstant), or even when there is a misalignment between a micro lens array and a photo detector, by calculating a shift amount related to the gap of relative positions between the reduced object images through correlation calculation between the reduced object images using the image data of a plurality of the reduced object images, and then calculating a conversion equation indicating the geometric projection process based on the shift amount.

With embodiments of the present invention described hereinafter with reference to the accompanying drawings, it is to be understood that the invention is not limited to those precise embodiments, and that various changes and modifications may be effected therein by one skilled in the art without departing from the scope or spirit of the invention as defined in the appended claims.

Figure 1:
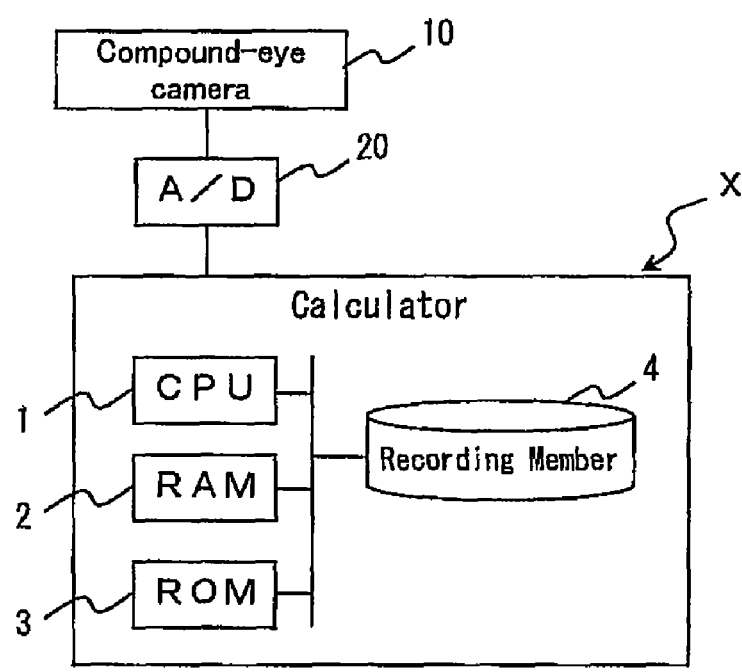
FIG. 1 is a block diagram showing a general structure of an image configuring apparatus X according to an embodiment of the present invention.

Referring now to the block diagram illustrated in FIG. 1, the structure of an image configuring apparatus X according to an embodiment of the present invention is described.

Image configuring apparatus X is a general calculator such as personal computers, and comprises: a CPU1 for executing various calculation processing, a RAM2 as a main memory for developing a program when CPU1 conducts an image processing program, a ROM3 in which a basic program forming a part of the operating system of Image configuring apparatus X is recorded, and a recording member 4 as a recording means for such as hard disks in which image processing programs as well as various data are recorded. Furthermore, though not shown in FIG. 1, Image configuring apparatus X also comprises other structural elements a general calculator comprises.

Image configuring apparatus X is connected to a compound-eye camera 10 having the structure indicated in FIG. 8(b) through a A/D converter 20, and inputs an image data converted from a plurality of reduced object images obtained by photographing an object by Compound-eye camera 10 into a digital signal by A/D converter 20, thereby recording the image data into Recording member 4 (one example of the reduced image recording means).

Moreover, Image configuring apparatus X reads the image data of a plurality of the reduced object images from Recording member 4 and configures a single object image based on such read image data (reduced object image), then outputs (stores) the image data into Recording member 4 and, at the same time, as a graphic image, outputs into a display means such as CRT displays not shown or into an image forming means such as printers.

Figure 8:
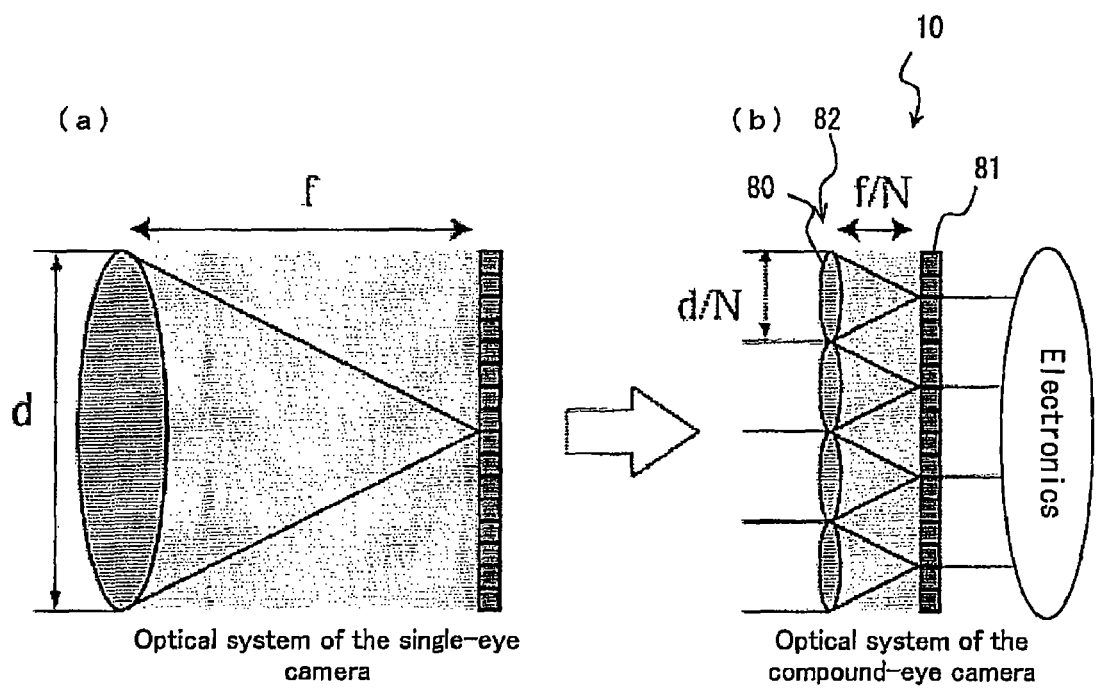
FIGS. 8(a) and (b) respectively show an optical system of a single-eye camera and an optical system of a compound-eye camera in a general manner.

As shown in FIG. 8, Compound-eye camera 10 focuses a plurality of reduced object images on a photo detector 81 through a micro lens array 82 in which a plurality of micro lenses are arranged, thereby outputting a signal (analog signal) of each of the reduced object images.

[The First Example of Image Processing]

Figure 2:
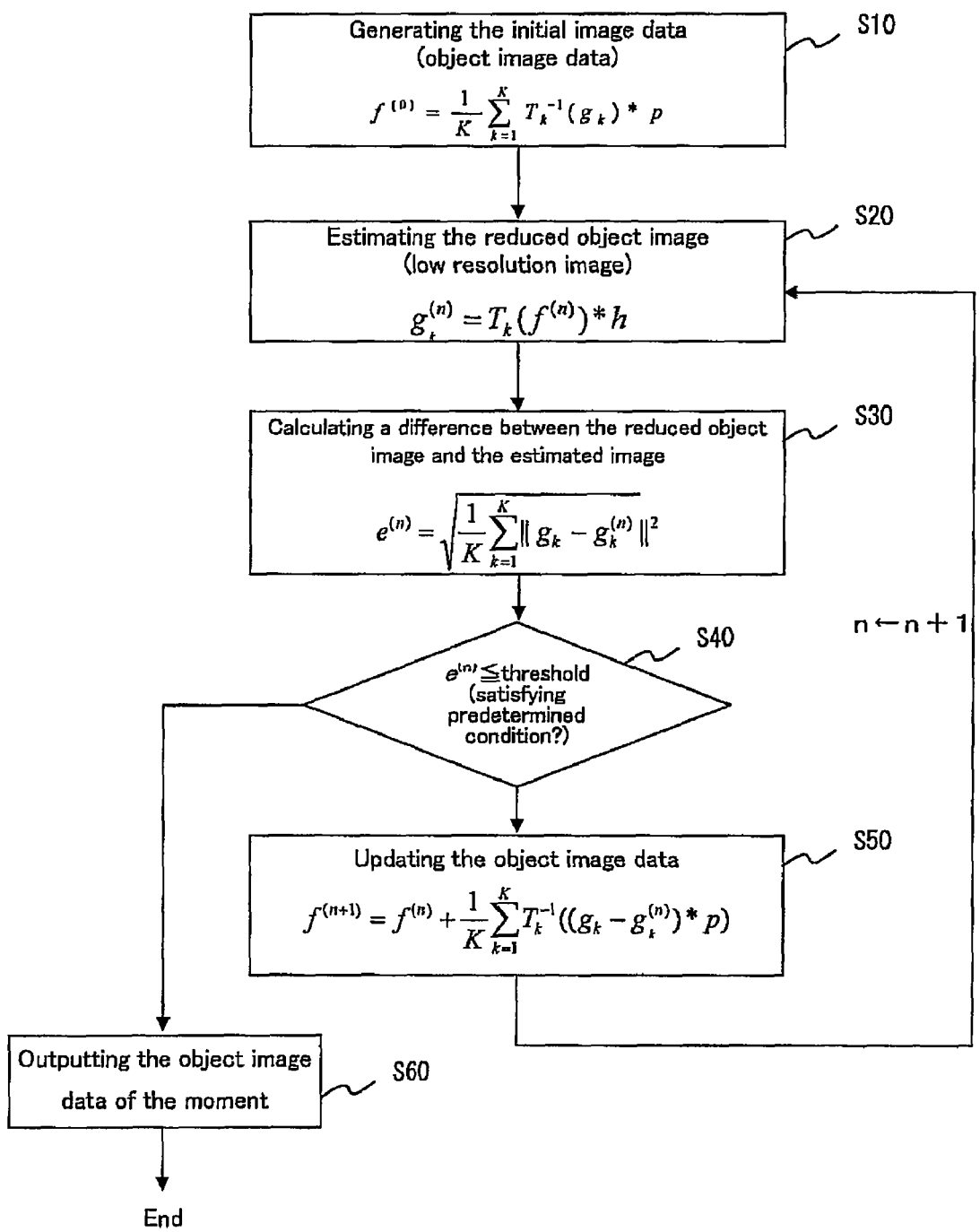
FIG. 2 is a flow chart showing processing steps of the first example of image processing conducted by Image forming apparatus X.

Next as referring to the flow chart illustrated in FIG. 2, a step for the first example of image processing conducted by Image configuring apparatus X is explained. The present image processing is for configuring a single object image based on an image data of a plurality of the reduced object images and outputting said image data, executed by CPU1 (one example of the object image configuring means) in Image configuring apparatus X in accordance with an image processing program set preliminarily. The following S10, S20 and so on indicate the number of processing steps. Prior to the execution of the present image processing, an image data of a plurality of reduced object images obtained by photographing a photogenic subject (hereinafter referred to as an "object") using Compound-eye camera 10 is assumed to be recorded in Recording member 4 (one example of the reduced image recording means).

Here, it is assumed that there are no misalignment between Micro lens array 82 and Photo detector 81, and further, the distance between the object and Micro lens array 82 is already known (including when a result measured by some sort of methods is prescribed). Also, the arranging intervals of each of Micro lenses 80, as well as the focal length are also known. With these known information, based on known optical theories, by calculating the magnification ratio of the reduced object optical system from a distance to the object, and further, clarifying the relationship between a pixel of a reduced object image and the object area, a conversion equation $T_k$, that indicates a geometric projection process from an actual image of the object to each of the reduce object image, and its inverse conversion equation $T_k^{-1}$ can be obtained.

In the first example of image processing, such $T_k$ and $T_k^{-1}$ obtained as above are assumed to be preliminarily provided. Here, the subscript "k" indicates an identifying number (k=1~K) of each of the reduced object images. $T_k$, for example, can be indicated by such as functions or determinants of matrix, and $T_k^{-1}$ can be their inverse conversion functions, inverse matrix, or pseudo inverses matrix.

<Step S10>

Firstly, reading an image data $g_k$ of a plurality of the reduced object images from Recording member 4, then generating an initial image data $f^{(0)}$ (initial high-resolution image) of a single object image based on the read image data $g_k$ (one example of the generating process of an initial object image).

Here, an initial image data $f^{(0)}$ is obtained by applying image data $g_k$ of a plurality of the reduced object images to the following expression (1) which is based on an inverse conversion equation $T_k^{-1}$.

[Mathematical expression 1]

$$f^{(0)} = \frac{1}{K}\sum_{k=1}^{K} T_k^{-1}(g_k)^* p \quad (1)$$

In Expression (1), * stands for a convolution arithmetic expression, and p is a parameter referred to as "back projection kernel", both are to be defined so as to satisfy expression (5) described later.

<Step S20>

Next, estimating an image data $g_k^{(n)}$ of an estimated image of each of the reduced object images from provided image data $f^{(n)}$ (n=0, 1, 2, . . . ) of single object image (based on a geometric projection process) through the following expression (2) which is based on the conversion equation $T_k$ indicating a geometric projection process from an actual image of the object to each of the reduce object images (one example of the reduce image estimating process).

[Mathematical Expression 2]

$$g_k^{(n)} = T_k(f^{(n)})*h \quad (2)$$

Here, n stands for the number of times of a repetitive processing (iterative processing) described later, and provides the initial image data $f^{(0)}$ obtained in S10 as an initial value (n=0) of Image data $f^{(n)}$ of the single object image. In addition, h stands for a known blurring process (hereinafter, as well) in each of reduced object optical system including each of Micro lenses 80 and Photo detector 81 (each element configuring the array). For example, with respect to h, an object as a photographic subject and reduced object images may be expressed by a matrix vector, and a point spread function in optical system may be employed as a matrix. When a point spread function is unknown, a Gaussian distribution function may be employed.

<Step S30>

Next, obtaining a difference indicator $e^{(n)}$ as an evaluation indicator of the difference (gap) between an estimated image $g_k^{(n)}$ of each of the reduced object images estimated in S20 and each of the reduced object images $g_k$.

In concrete, for example, the above is obtained through the next expression (3).

[Mathematical expression 3]

$$e^{(n)} = \sqrt{\frac{1}{K}\sum_{k=1}^{K}\|g_k - g_k^{(n)}\|^2} \quad (3)$$

<Step S40>

Next, determining whether or not the difference indicator $e^{(n)}$ obtained in S30 satisfies the predetermined condition (in short, whether the difference satisfies the predetermined condition).

Here, whether the difference indicator $e^{(n)}$ becomes less than or equal to the prescribed threshold is the predetermined condition. In addition to this, for example, other predetermined conditions may be employed, such as setting the predetermined condition to whether or not an improved width (a lowering width) from the difference indicator $e^{(n)}$ in the prior time becomes less than or equal to the prescribed threshold.

<Step S50>

In S40, when it is determined that the difference indicator $e^{(n)}$ does not satisfy the predetermined condition (in short, the difference does not satisfy the predetermined condition), an image data $f^{(n)}$ of the single object image is updated by projecting (back projecting) the difference $(g_k-g_k^{(n)})$ between an estimated image and a reduced object image in a inverse process of the geometric projection process based on the inverse conversion equation $T_k^{-1}$ (one example of the object image updating process).

Here, when the image data of the single object image after updating is assumed to be $f^{(n+1)}$, for example, the updating process is conducted through the following expression (4).

[Mathematical expression 4]

$$f^{(n+1)} = f^{(n)} + \frac{1}{K} \sum_{k=1}^{K} T_k^{-1}((g_k - g_k^{(n)})^* p) \quad (4)$$

Here, in order to converge the difference $e^{(n)}$ by repetitively conducting S20 (in short, executing Expression (2)) and S50 (in short, executing Expression (4)), it has been understood that p should be prescribed so as to satisfy the following expression (5).

[Mathematical Expression 5]

$$\|\delta - h^* p\|_2 \leq 1 \quad (5)$$

Here, $\delta$ stands for a delta function. In the processing S50, p should be prescribed so as to satisfy Expression (5).

After conducting the above updating processing of the image data $f^{(n)}$ (S50), stepping back to S20, and repetitively conducting the above-mentioned processing with respect to the image data $f^{(n)}$ of after updating.

This provides the initial image data $f^{(0)}$ obtained in S10 in S20 (the reduced image estimating process) as an initial value of the image data $f^{(n)}$ of the single object image, and then repetitively conducts the processing S20 to S50 (the reduced image estimating process and the object image updating process) until the difference $e^{(n)}$ satisfies the predetermined condition.

<Step S60>

When the difference $e^{(n)}$ was determined to satisfy the predetermined condition in S40, the image data $f^{(n)}$ of the single object image of the moment is output (stored) into Recording member 4 as an image data of a final object image, and at the same time into a display means such as CRT displays not shown as a graphic image, then after that, the present image processing is ended.

The processing in S30, S40 and S60 here are the example of processing of the iterative control process.

Figure 4:
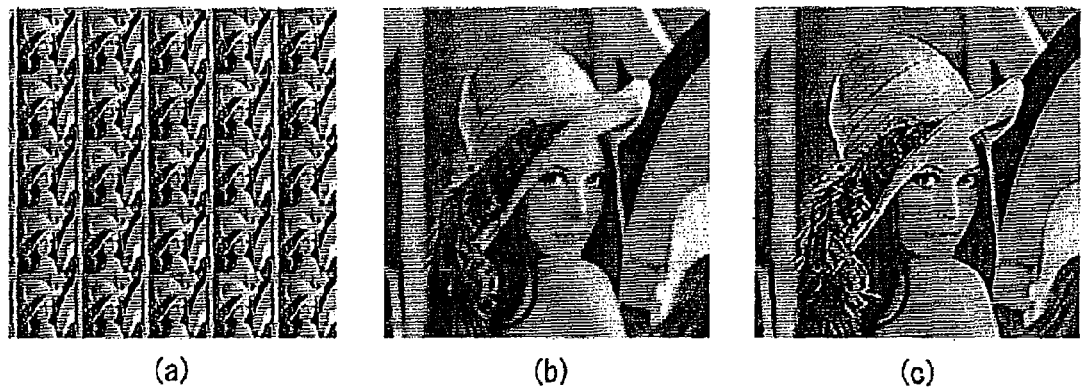
FIGS. 4(a) (b) and (c) respectively show an example of an object image configured by the first example of image processing.

Illustrated in FIG. 4 is one example of the image obtained by the present image processing.

FIG. 4(a) shows the reduced object image, FIG. 4(b) shows the object image obtained through the pixel rearranging method based on the reduced object image in FIG. 4(a), and FIG. 4(c) shows the object image obtained by the present image processing based on the reduced object image in FIG. 4(a).

The number of arrays in Micro lens array 82 is 5×5, and each of the reduced object images are formed in 80×80 pixels.

The pixel number of the object images (b) and (c) configured through the pixel rearranging method or the present image processing are equivalent to the total pixel number (400×400 pixels) of the original reduced object images.

From the comparison between FIGS. 4(b) and (c), it can be assured that the present image processing realizes production of a high-resolution image. Particularly, sharpening effect in the edge area as a high-frequency component of the image should be noted.

[The Second Example of Image Processing]

In the first example of image processing, it is assumed that there are no misalignment between Micro lens array 82 and Photo detector 81, and further, the distance between the object and Micro lens array 82 is already known.

However, in a practical system, a misalignment between a micro lens array and a photo detector is often unavoidable in the current position adjustment technology.

In addition, fixing the distance between Compound-eye camera and an object, as well as measuring and setting the distance every time the distance changes are not practical. In the iterative back projection method, the above concerns related to the difference amount are not considered.

Figure 3:
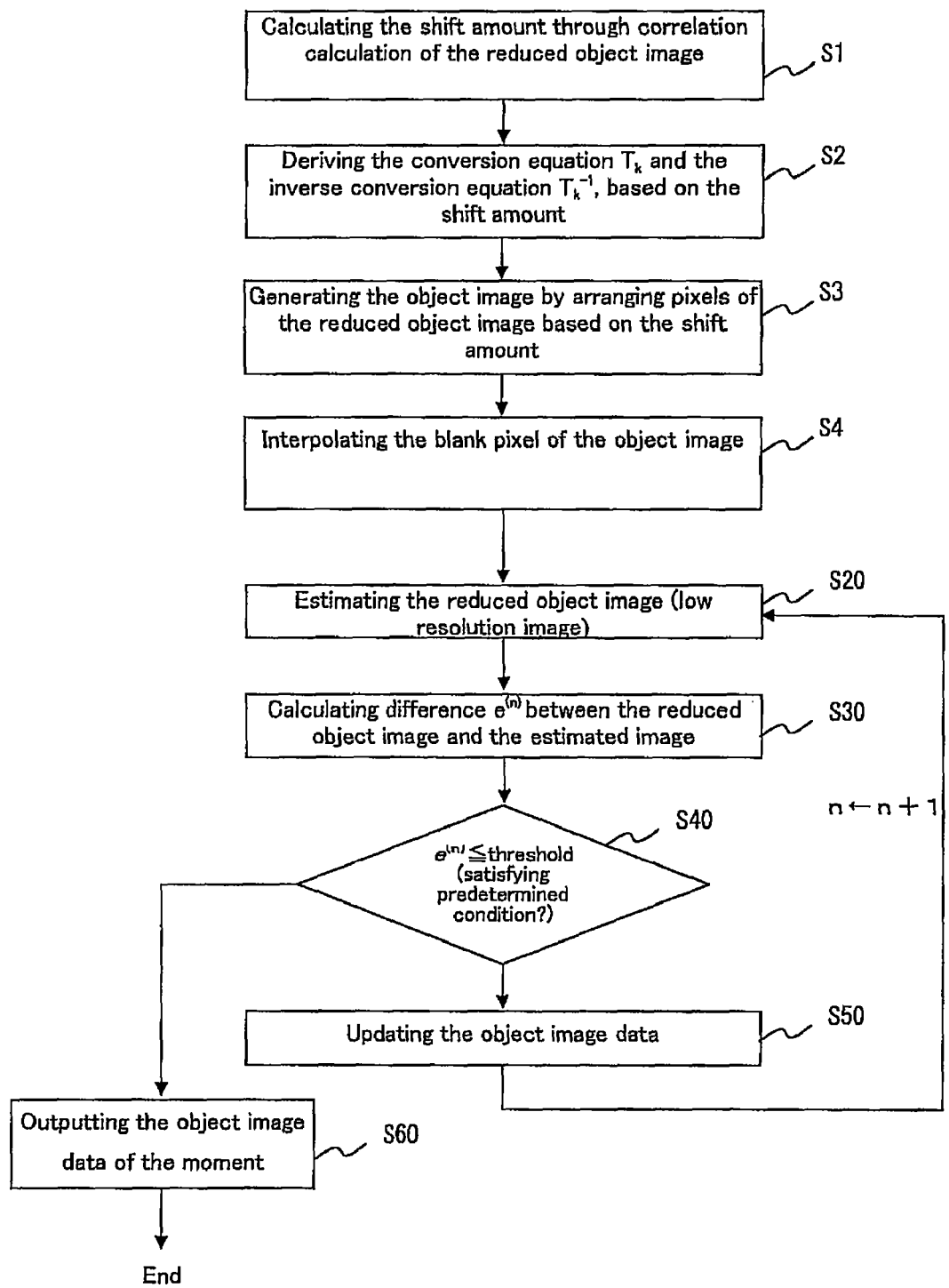
FIG. 3 is a flow chart showing processing steps of the second example of image processing conducted by Image forming apparatus X.

Hereinafter, as referring to the flow chart illustrated in FIG. 3, the second example of image processing, that is capable of compensating the misalignment between Micro lens array 82 and Photo detector 81 as well as the change of the distance between the object and Micro lens array 82, is explained.

The present image processing is same as the first example of image processing, except replacing S1 to S4 described later with the generating processing of initial image data (S10) described in the first example of image processing (FIG. 2). CPU1 of Image processing apparatus X (one example of the object image configuring means) executes the image processing according to the image processing program preliminarily set also in the present image processing. The following S1, S2 and so on indicate the number of processing steps. Prior to executing the present image processing, an image data of a plurality of reduced object images obtained by photographing a photogenic subject (hereinafter referred to as an 'object') using Compound-eye camera is assumed to have been recorded in Recording member 4 (one example of the reduced image recording means).

<Step S1>

Firstly, obtaining a shift amount in regard to a gap of relative positions between the reduced object images through correlation calculation between the reduced object images by using the image data of a plurality of the reduced object images (one example of the shift amount calculating process).

A gap of relative positions between the reduced object images is generated caused by the parallax between each optical system (micro lens).

The details on the present processing are explained hereinafter.

Firstly, the relative shift amount of the reduced object image is hypothetically limited to the parallel shift for simplicity.

Normalized cross correlation function Rc (x, y) of two of two variable functions f (x, y) and g(x, y) is generally defined through the following expression (6).

[Mathematical Expression 6]

$$Rc(x, y) = \frac{\int_{-\infty}^{\infty}\int_{-\infty}^{\infty} f(x', y') g(x'-x, y'-y) dx' dy'}{\sqrt{\int_{-\infty}^{\infty}\int_{-\infty}^{\infty} |f(x', y')|^2 dx' dy'} \sqrt{\int_{-\infty}^{\infty}\int_{-\infty}^{\infty} |g(x', y')|^2 dx' dy'}} \quad (6)$$

Figure 6:
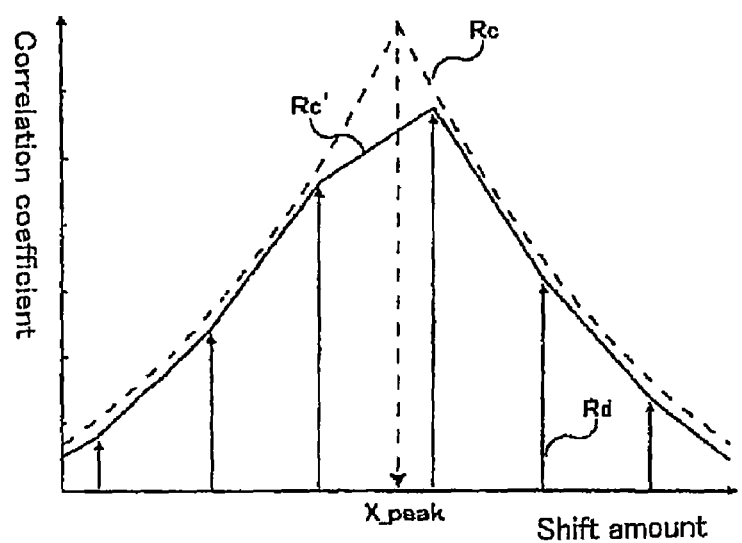
FIGS. 6(a) and (b) respectively show a correlation function between reduced object images.
Figure 6:
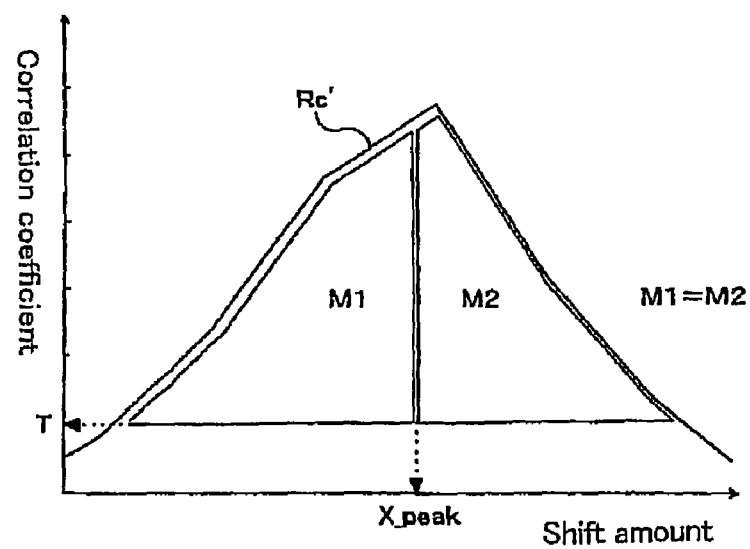

Since each of the reduced object image has an identical shape, when two variable functions f(x, y) and g(x, y) are assumed being identical, the correlation signal waveform Rc (x, y) becomes symmetric about a correlational peak (x_peak in FIG. 6) as shown in a dotted line in FIG. 6(a). In this case, the relationship of the following expression (7) is approved in between Rc (x, y) and x_peak. Here, Expression (7) is expressed in one dimension for simplicity.

[Mathematical Expression 7]

$$\int_{-\infty}^{x\_peak} R(x)dx = \int_{x\_peak}^{\infty} R(x)dx \quad (7)$$

Consequently, when the correlational peak between the reduced object images is calculated by applying Expressions (6) and (7) to the reduced object images of Compound-eye camera 10, the relative position between the reduced object images can be figured out.

Here, since the reduced object images are constituted from dispersed points that are sampled by Photo detector 81, the normalized cross correlation function becomes discrete, and therefore, a discrete correlation function $Rd(x_i, y_j)$ defined in the following expression (8) is applied (identified by arrows in FIG. 6(a)). Additionally, the sampled shift positions are indicated as $\{x_i:i=0, 1, 2, \ldots, N, y_j:j=0, 1, 2, \ldots, M\}$.

[Mathematical expression 8]

$$Rd(x_i, y_j) = \frac{\sum_{l=0}^{M}\sum_{k=0}^{N} f(x_k, y_l)g(x_k - x_i, y_l - y_j)}{\sqrt{\sum_{l=0}^{M}\sum_{k=0}^{N}|f(x_k,y_l)|^2}\sqrt{\sum_{l=0}^{M}\sum_{k=0}^{N}|g(x_k,y_l)|^2}} \quad (8)$$

Furthermore, in order to obtain the shift amount indicating the correlational peak of the correlation function $Rd(x_i, y_j)$, the correlation function $Rc'(x, y)$ identified in full line in FIG. 6(a) is obtained by conducting linear interpolation according to the following expression (9). [x] stands for the integer part of x.

[Mathematical Expression 9]

$$Rc'(x)=Rd([x])+\{Rd([x]+1)-Rd([x])\}(x-[x]) \quad (9)$$

Here, as shown in FIG. 6(a), since the correlation function $Rc'(x, y)$ obtained through Expression (9) is what a discrete correlation function is linear interpolated, it is impossible to directly identify an accurate x_peak from the correlation function $Rc'(x, y)$.

There, the correlation function $Rc'(x, y)$ becoming symmetric about x_peak since the reduced object images are identical can be utilized. In other words, by applying the $Rc'(x, y)$ to Expression (7), x_peak is figured out based on the shift amount that bisects the area obtained by integrating $Rc'(x, y)$ within the prescribed range, as shown in FIG. 6(b).

The above enables figuring out of the relative position between each of the reduced object images.

By repetitively executing the steps similar to the above with respect to every reduced object image, the relative position of every other reduce object image (alignment gap) in regard to a reference reduced object image is figured out.

With this amount of alignment gap, the corresponding relationship between the reduced object images including misalignment and the reconstructed images, in short, the shift amount (moving amount) of each pixel necessary for configuring a single object image, can be obtained.

As shown in FIG. 6(b), by providing a prescribed threshold value T, integration of only the data that overtakes the threshold value may be conducted when figuring out the x_peak. Such provision of the threshold value T enables calculating the relative position (in short, shift amount) by using the data near the correlational peak between the reduced object images, thereby figuring out more accurate relative position (alignment gap).

Additionally, the distance between the object and the apparatus can be derived from the known parameters of hardware, such as, the shift amount, the lens interval of the micro lens array, and the focal length.

<Step S2>

Next, based on the shift amount obtained in S1 (shift amount calculating process), the conversion equation $T_k$ indicating the geometric projection process employed in S20 (one example of the reduced image estimating process), as well as its inverse conversion equation $T_k^{-1}$ are obtained (one example of the projection process deriving process).

Since such as the relative position between the micro lenses photographing each of the reduced object images and the focal length of the micro lenses are known, when the shift amount indicating the gap of relative positions between the reduce object images is obtained, the distance between the object as a photogenic subject and Micro lenses 80 as well as the multiplication ratio of the optical system can be obtained. A conversion equation $T_k$ indicating the geometric projection process by a theoretical equation of a known optical system can be obtained from the above ratio and an area (extent) of a photo detector per pixel. Furthermore, from the conversion equation $T_k$, its inverse conversion equation $T_k^{-1}$ (such as, the inverse matrix and pseudo inverse matrix) can be obtained.

Here, the distance to the object, under the condition that the interval between Micro lens array 82 and Photo detector 81 is ideally aligned, can be derived with accuracy by obtaining an object distance (distance to the object) figured out from the shift amount per pixel for every reduced object image and then averaging these object distances.

Accordingly, if there is a misalignment between Micro lens array 82 and Photo detector 81, as mentioned above, the misalignment is considered to a distance to the object obtained on the basis of the shift amount obtained through correlation calculation of the reduce object image, and a conversion equation indicating the geometric projection process obtained on the basis of such distance achieves compensation of the misalignment. Here, when the shape of each pixel of Photo detector 81 is known, an optional fill factor ratio of the photo detector can be employed.

Consequently, it is unnecessary to set up the distance between Compound-eye camera 10 (micro lens array) and the object in each case, and even when the distance is unknown (inconstant), or there is a misalignment between the micro lens array and the photo detector, the conversion equation indicating the geometric projection process reflecting these can be derived.

<Step S3>

Next, generating an initial image data of a single object image of which the gap of a relative position is amended, by arranging a plurality of the reduced object images on a same area based on the shift amount obtained in S1 (shift amount calculating process).

Figure 7:
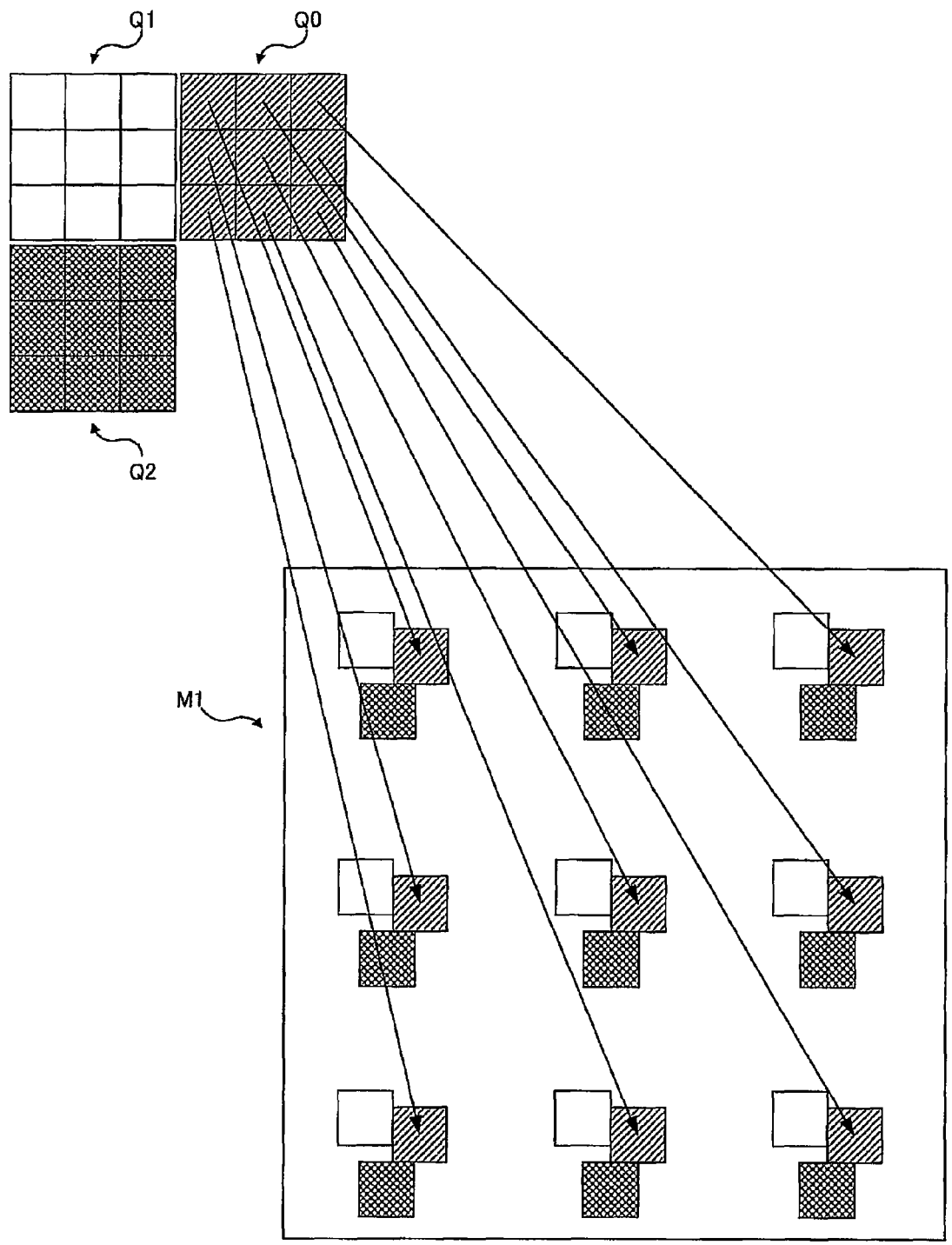
FIG. 7 shows an arrangement of a plurality of reduced object images on a same area in a general manner.

FIG. 7 shows arrangement of a plurality of the reduced object images on a same area in a general manner. Q0, Q1 and Q2 respectively indicate the reduced images having 3×3 pixels focused on Photo detector 81, and M1 is the area where a single target image is configured. The area M1 is reserved, for example, in a part of the area in RAM 2, and its number of pixels is assumed to be the same as the number of pixels in the entire photo detector.

In the present processing, firstly, arranging the pixels of the reduce object images (indicated at Q0 in FIG. 7), which are set as the standard in S1, in accordance with the scale of in the area M1, as indicated by arrows.

Then, arranging the pixels of the other reduced object images (indicated as Q1 and Q2 in FIG. 7) into the area M1 based on the shift amount calculated in S1.

Consequently, a single object image of high-resolution, in which the gap of relative position between the reduced images are amended and arranged on the area M1 is configured.

<Step S4>

Next, conducting the interpolation processing of the blank pixels in regard to the image data of the object image obtained in S3. Here, S3 and S4 are the example of the generating process of initial object image.

If there are no blank pixels in the image data of a single object image obtained in S3, this image data can directly be the initial image data. However, the single object image obtained in S3 is the image in which the pixels of each reduced object image are merely arranged into the expanded same area, and therefore, it might include a blank pixel, depending on the object distance between the object and Micro lens array 82, or if there is the misalignment. Using such image including a blank pixel as an initial image data, blank pixels may become noise factors and such noise signal is emphasized in the iterative back projection process described later, so it is not appropriate as the initial image data.

Additionally, when there is the misalignment, if the initial image data is generated through application of the inverse conversion equation $T_k^{-1}$ obtained without consideration of such misalignment like a conventional iterative back projection method, there generates a difference in corresponding relationship between a reduced object image and an estimated reconstructed image. This difference indicates that there is a difference between the actual object information and the reconstructed image. The accuracy of the initial image (the amount of the difference) affects the speed (time) of the iterative processing as well as the image quality of the high-resolution image finally obtained. Therefore, it is not appropriate to generate the initial image data by applying the inverse conversion equation $T_k^{-1}$ obtained without consideration of the misalignment.

Therefore, when there is a blank pixel, interpolation is conducted by using pixel values of neighboring pixels. In such case, when it is assumed that the pixel value changes linearly in the horizontal or the perpendicular directions in a blank pixel, and if $N_{del}$ unit of the blank pixels exist successively, the pixel value $P_{del}(i)$ interpolating the i th blank pixel can be calculated through the following expression (10) for example. Here, P1 and P2 are pixel values of the pixels in vicinity of a blank pixel.

[Mathematical expression 10] (10)

$$P_{del}(i) = P1 + (P2 - P1)\frac{i}{N_{del} + 1}$$

An average value of values obtained by applying Expression (10) in the horizontal or the perpendicular directions in respect to the target blank pixel is the pixel value of the blank pixel.

With the above, blank pixels are eliminated and an image which is close to an actual object image with high resolution can be obtained.

Hereinafter, executing the processing in S20 to S60 mentioned above, by using the image data of an object image after interpolating the blank pixel obtained in S4 as the initial image data, and further, by employing the conversion equation $T_k$ indicating the geometric projection process as well as its inverse conversion equation $T_k^{-1}$ obtained in S2.

With the above processing, it is no more necessary to prescribe a distance between Compound-eye camera 10 (micro lens array) and the object in each case, and even when such distance is unknown (inconstant), or there is a misalignment between the micro lens array and the photo detector, an object image of high-resolution can be obtained.

Figure 5:
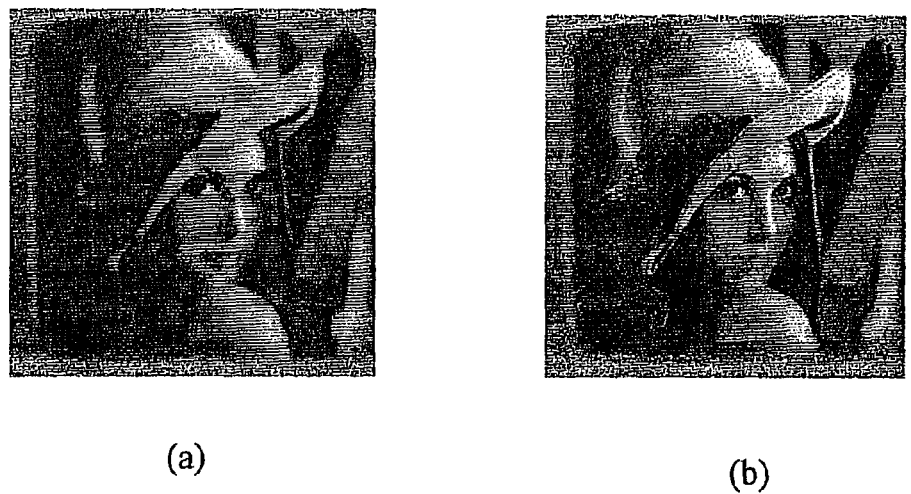
FIGS. 5(a) and (b) respectively show an example of an object image configured by the second example of image processing.

One example of the image obtained by the present image processing is shown in FIG. 5.

FIG. 5(a) shows an object image obtained through the pixel rearranging method based on a plurality of reduce object images obtained by Compound-eye camera 10, and FIG. 5(b) shows an object image obtained by the present image processing based on the reduce object images as well.

The imaging condition of the example in FIGS. 5(a) and (b) are as follows.

The focal length for each micro lens is 1.3 millimeter, the lens diameter is 0.5 millimeter, and the photographic object is placed and photographed in the distance of 520 millimeter from the micro lens. The obtained image is consisted of 5×5 (N=5) unit of the reduced object images, and each reduced object image has 160×160 pixels, and a color CCD using a RGB filter based on the Bayer array (handling the information of a set of channels R, G, and B in 2×2 pixels) is used as a light receiving member. Consequently, the information of each channel R, G, and B is 80×80 pixels per reduced object optical system.

Each of the object images in FIGS. 5(a) and (b) are consisted of 400×400 pixels. When comparing FIGS. 5(a) and (b), though unevenness in the degree of high-resolutions can be seen, the eyes and the bill of the hat can be recognized clearly.

As a result of the above, from the present image processing example 2, it can be understood that an object image of high-resolution can be obtained, even when the distance between a camera (micro lens array) and an object is unknown (inconstant), or there is a misalignment between a micro lens array and a photo detector.

What is claimed is:

1. An image configuring apparatus comprising:
an object image configuring means, which reads image data of a plurality of reduced object images from a reduced image recording means for recording image data of a plurality of reduced object images obtained by photographing an object as using a compound-eye camera that focuses a plurality of reduced object images on a photo detector through micro lens array having a plurality of micro lenses arrayed therein, and configures a single object image based on said image data and then outputs its image data,
wherein said object image configuring apparatus is also configured that said micro lens and said light receiving elements are set without alignment error, and preset in the conditions including the distance between object and micro lens array, using the aligning distance of each micro lens of lens array and the focal length of micro lens array, and based on such presetting condition, the magnification ratio of reducing optical system is calculated with the known distance to the object, and by obtaining the relation among one pixel of the reduced image element and its corresponding area of the object, and previously obtain the geometric transfer function $T_k$ describing optical projection from the said real object to create said reduced image element and inverse transfer function $T_k^{-1}$;

wherein said object image configuring means comprises:

a generating means of initial object image for generating an initial image data of a single object image based on an image data of a plurality of said reduced object images captured by said micro lens array under said known condition using said inverse transfer function $T_k^{-1}$;

a reduced image estimating means for estimating an estimated image of each of said reduced object images from an image data of a provided single object image which comes from said generating means of initial object image, based on a geometric projection process where said transfer function $T_k$ is used;

an object image updating means for updating an image data of said single object image provided in said reduced image estimating means by projecting a difference between said estimated image of each reduced object images which comes from said reduced image estimating means and each of said reduced object images which is captured under said known condition of micro lens array, using said inverse process $T_k^{-1}$ of said geometric projection process; and an iterative control means for firstly giving said initial image data to said reduced image estimating means as an initial value of an image data of said single object image, and then repetitively conducting an estimating processing of said reduced image estimating means as well as an updating processing of said object image updating means until said difference satisfying a predetermined condition, then outputting an image data of said single object image at the time of said difference satisfying said predetermined condition as a final image data of an object image.

2. An image configuring apparatus according to claim 1, wherein said object image configuring means further comprises a shift amount calculating means for calculating a shift amount in regard to a gap of relative positions between said reduced object images through correlation calculation between said reduced object images by using an image data of a plurality of said reduced object images.

3. An image configuring apparatus according to claim 2, wherein said object image configuring means further comprises a projection process deriving means for obtaining a conversion equation indicating said geometric projection process employed in said reduced image estimating means based on said shift amount obtained in said shift amount calculating means.

4. An image configuring apparatus according to claim 2, wherein said generating means of initial object image in said object image configuring means generates an image data of a single object image by arranging a plurality of said reduced object images onto a same area based on said shift amount obtained in said shift amount calculating means, and then generates an initial image data of said single object image by interpolating blank pixels with respect to said image data.

5. An image configuring method for configuring a single object image based on an image data of a plurality of reduced object images obtained by photographing an object as using a compound-eye camera that focuses a plurality of reduced object images on a photo detector having a plurality of light receiving elements through micro lens array having a plurality of micro lenses arrayed therein, comprising the steps of:

configuring the plurality of micro lenses and the plurality of light receiving elements in corresponding micro lens/light receiving element pairs positioned without alignment error, setting a distance between the object and the micro lens array, according to an aligning distance of each micro lens of lens array and the focal length of the micro lens array, generating an initial image data of a single object image based on an image data of a plurality of said reduced object images using known conditions and an inverse transfer function $T_k^{-1}$;

estimating an estimated image of each of said reduced object images from an image data of a provided single object image based on a geometric projection process using a transfer function $T_k$;

updating an image data of said single object image provided in said reduced image estimating process by projecting a difference between estimated images of each of said reduced object images and each of said reduced object images in an inverse process ($T_k^{-1}$) of said geometric projection process; providing said initial image data to said reduced image estimating process as an initial value of an image data of said single object image;

repetitively conducting said reduced image estimating process as well as said object image updating process until said difference satisfying a predetermined condition; and outputting image data of said single object image at the time of said difference satisfying said predetermined condition as a final image data of an object image.

* * * * *